(12) United States Patent
Adapala et al.

(10) Patent No.: US 10,692,116 B1
(45) Date of Patent: Jun. 23, 2020

(54) OPTIMIZATION OF AD REQUEST FULFILLMENT FOR MOBILE DEVICE APPLICATIONS

(71) Applicant: Amazon Technologies, Inc., Seattle, WA (US)

(72) Inventors: Vijay Sandeep Damodar Adapala, San Jose, CA (US); Matthew Hamilton Battles, Palo Alto, CA (US); Lionel Bitoun, Palo Alto, CA (US); Rohit Chhapolia, Los Gatos, CA (US); Bryan Thomas Quinn, Belmont, CA (US); Prashant Bhushan Singh, Santa Clara, CA (US); Wei Zhuang, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 974 days.

(21) Appl. No.: 14/867,457

(22) Filed: Sep. 28, 2015

Related U.S. Application Data

(60) Provisional application No. 62/212,155, filed on Aug. 31, 2015.

(51) Int. Cl.
*G06Q 30/02* (2012.01)
*H04W 4/60* (2018.01)

(52) U.S. Cl.
CPC .......... *G06Q 30/0275* (2013.01); *H04W 4/60* (2018.02)

(58) Field of Classification Search
CPC combination set(s) only.
See application file for complete search history.

(56) References Cited

U.S. PATENT DOCUMENTS

| 2008/0040329 | A1* | 2/2008 | Cussen | G06F 17/30867 |
| 2013/0227607 | A1* | 8/2013 | Saltonstall | H04N 21/458 |
| | | | | 725/35 |
| 2014/0222618 | A1* | 8/2014 | Stamp | G06Q 30/0611 |
| | | | | 705/26.35 |
| 2015/0051968 | A1* | 2/2015 | Sotelo | G06Q 30/0277 |
| | | | | 705/14.45 |

\* cited by examiner

*Primary Examiner* — Mario C. Iosif
(74) *Attorney, Agent, or Firm* — Eversheds Sutherland (US) LLP

(57) ABSTRACT

Systems, methods, and computer-readable media are disclosed for optimization of ad request fulfillment for mobile device applications. In one embodiment, a system may receive an ad request from a mobile device, and determine a first price point associated with a publisher of the ad request. The system may send a bid request to ad servers, receive a first bid with a first bid amount, and may determine that the first bid amount is a highest bid amount. The system may determine that the first price point is less than the first bid amount, and may send the first bid amount and the first price point to the mobile device, where the mobile device is configured to send the first bid amount and the first price point to a publisher ad server, and the publisher ad server is configured to determine that the first bid amount is a winning bid amount.

20 Claims, 6 Drawing Sheets

OPTIMIZATION OF AD REQUEST FULFILLMENT FOR MOBILE DEVICE APPLICATIONS

CROSS-REFERENCE TO RELATED APPLICATIONS

This application claims the benefit of U.S. Provisional Application No. 62/212,155, filed Aug. 31, 2015, which is hereby incorporated by reference in its entirety.

BACKGROUND

Advertisers may purchase advertisement ("ad") inventory from various publishers of content, such as web sites, for the opportunity to present ads to viewers. In some instances, publishers may attempt to sell ad inventory to advertisers, but may be unable to find a buyer of certain ad inventory. As a result, certain ad inventory may remain unsold, reducing advertising revenue and/or an advertisement fill rate for publishers. Similarly, advertisers may desire to present ads to certain target audiences, but may be unable to buy ad inventory from certain publishers.

Figure 1:
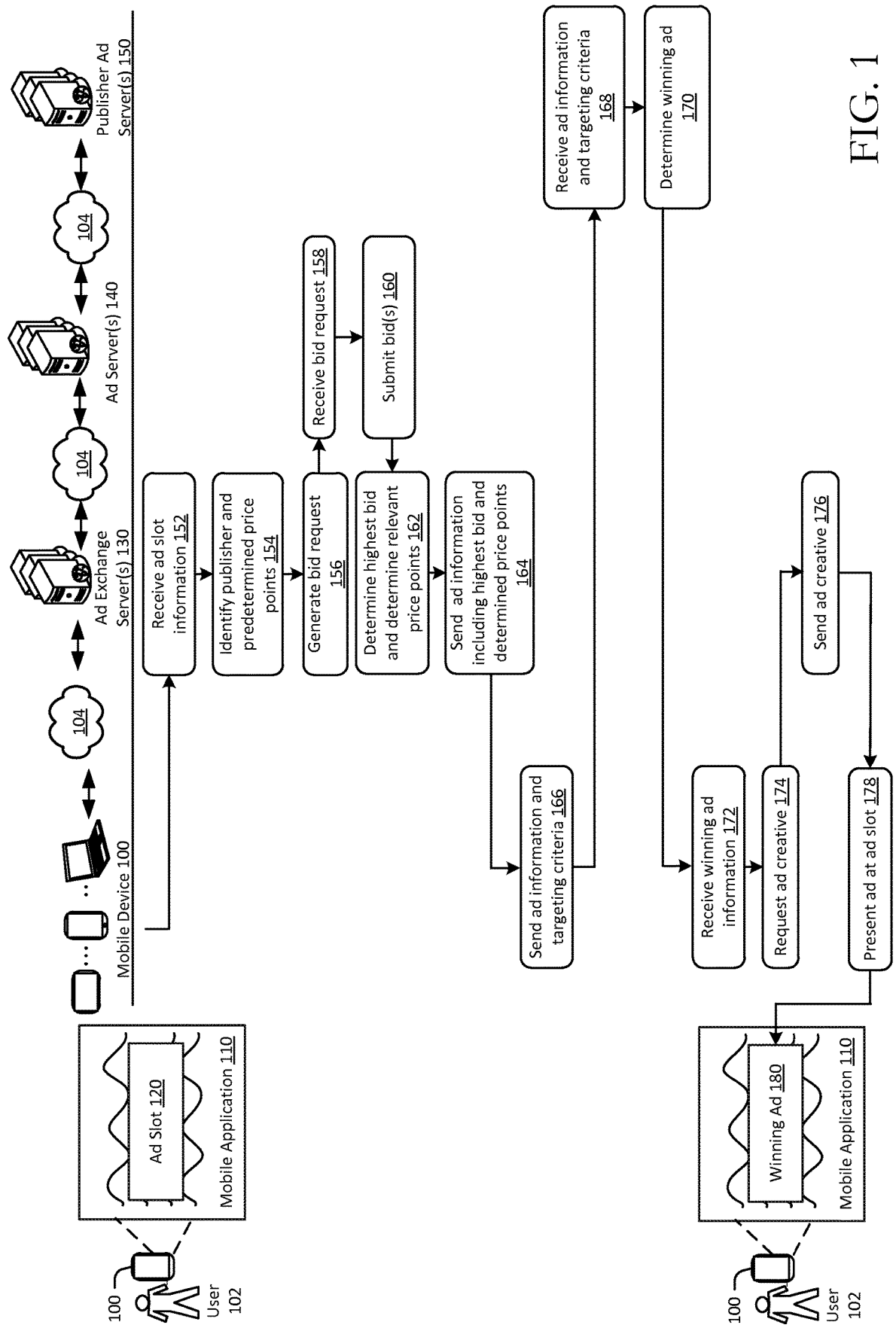
FIG. 1 is a schematic illustration of an example hybrid process and data flow diagram for optimizing ad request fulfillment for mobile device applications in accordance with one or more example embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

In the context of mobile application advertising, an advertisement may be delivered for presentation (e.g., rendering) in an advertising slot (also referred to herein as "ad slot"). Presentation of the advertisement in an advertising slot may be referred to as serving an advertisement impression. As used herein, the terms "advertising slot" or "available advertising slot" may refer generally to a location, environment, or placeholder in which, or in connection with which, an impression of an advertisement may be served. In a more specific context, these terms may refer to, for example, a particular location on a mobile application interface, or a specific time at which an impression of an advertisement may be presented at a mobile device for potential consumption by a user. A collection of available advertisements that may be presented in advertising slots may be referred to herein as "advertisement inventory." Further, the terms "delivery of an advertisement," "delivery of an advertisement impression," "presentment of an advertisement impression," "serving an ad impression," or any other similar term may be used interchangeably throughout this disclosure.

This disclosure relates to, among other things, systems, methods, computer-readable media, techniques, and methodologies for optimization of ad request fulfillment for mobile device applications. Embodiments of the disclosure may increase a number of bidders for mobile application ad slots, increase bid amounts for mobile application ad slots, and improve matching between advertisers and publishers to effectively fill available advertising slots. As a result, advertising earnings and fill rates, or rates at which available ad inventory is sold, may be maximized for mobile application developers or publishers. Embodiments of the disclosure may enable demand for ad slots at various points, without increasing latency or opportunity costs.

Mobile application developers may develop mobile device applications executable on various mobile platforms, such as iOS, Android, Fire OS, and the like. Embodiments of the disclosure may include software development kits or other modules that communicate with various mobile platforms to facilitate advertising within mobile applications executing on mobile devices.

In certain embodiments, a publisher or mobile application developer may contract for, or otherwise agree to, a set of one or more price points the publisher or mobile application developer will accept for one or more available ad slots. For example, the publisher may agree to accept $1 for a banner ad, and $2 for an interstitial ad with certain dimensions. In return, an ad exchange service provider may facilitate, or match, advertisers with the publisher or mobile application developer's available ad inventory. The advertisers may have relatively high value ads that, when interacted with (e.g., clicked on, hovered over, rolled over, etc.), result in advertising revenue for the publisher or mobile application developer. Additionally, the publisher or mobile application developer may have access to additional advertisers and user reach via the ad exchange server, which may facilitate increased sales of ad inventory. For example, previously unsold inventory may be sold via the ad exchange server in certain embodiments.

Embodiments of the disclosure may be configured to facilitate purchase of publisher or mobile application developer ad inventory before the ad inventory is sold to other advertisers. Certain embodiments may further target certain users with relevant advertisements, thereby increasing a likelihood of interaction with the advertisement, as well as a likelihood of increased advertising revenue. By using embodiments of the disclosure, advertisers may broaden user reach (e.g., as measured by unique devices) and ad visibility, which may result in increased advertising budgets and ad performance.

To serve ad impressions in a mobile device application context, advertisers or related parties may be subject to a bidding process for an available ad slot at the mobile device application, in which an ad impression of a winning bidder will be served. Before an ad impression is served to a potential consumer, an entity, such as an ad exchange system, may send a bid request for an advertisement to display in connection with an available advertising slot. The bid request may include ad slot information related to the specific available ad slot, such as a user identifier, a mobile device identifier, a mobile device application identifier, a publisher identifier, location information, chronological information, and other related information. The ad exchange system may include one or more ad exchange servers that facilitate bidding on advertising inventory. A collection of advertising inventory may be received by the ad exchange system from various website publishers, search engines, or other advertising publishers. More specifically, the advertising inventory, or information indicative thereof, may be received by the ad exchange system from mobile device application developers or publishers (or respective servers or devices associated with developers or publishers), search engine computers, or other advertising publisher computers that server one or more mobile applications with which an advertising slot is associated. The ad exchange system may send a bid request to various entities for an advertisement to be displayed or otherwise presented or served in connection with an available advertising slot. Various entities, such as ad servers or ad delivery servers, may be capable of communicating with the ad exchange system to submit bids in response to the bid request for the opportunity to present an ad impression in connection with the available advertising slot. In certain embodiments described herein, an ad server may be one ad server in a fleet of ad servers.

The bidding process may occur in real-time as bid requests for available advertising slots are received. In one or more representative scenarios, the entire time from transmission of the bid request from the ad exchange system to a bidding entity and receipt of a bid amount from the bidding entity by the ad exchange system may span approximately 100 milliseconds.

Advertisers may desire that ad impressions be served to users that match particular targeting criteria, or target consumers that match predefined user attributes in order to increase brand awareness and maximize the effects on the online behavior of users exposed to the campaign. Effectiveness of an ad campaign or impact of ads on online behavior of users may be measured in accordance with any suitable advertising performance metric such as a click-through rate, a number of clicks, a number of page views, a number of searches, and so forth.

In response to a bid request, bids may be submitted to the ad exchange system by various entities competing for the opportunity to present an advertisement impression for the available advertising slot. The bidder that submits the highest bid amount for a particular advertising slot may win the right to deliver an ad impression for that ad slot.

Certain embodiments of the systems and methods described herein may increase accessibility to available ad inventory for advertisers, and may also increase accessibility to advertisers for publishers or mobile application developers. As a result, mobile application developers or publishers may sell previously unsold inventory, and may sell inventory at increased prices, resulting in increased ad revenue for the publisher or mobile application developer, as well as increased effectiveness of advertisements for advertisers and increased user reach to reach additional target consumers.

Referring now to FIG. 1, an example hybrid process and data flow diagram for optimizing ad request fulfillment for mobile device applications in accordance with one or more example embodiments of the disclosure is schematically illustrated. A mobile device 100 may be any suitable mobile device, such as a smartphone, laptop, tablet, gaming console, wearable device, fashion accessory (e.g., glasses, etc.), or other mobile device. The mobile device 100 may be configured to execute mobile device applications, such as mobile games. In some embodiments, the mobile device 100 may include a display with which to present information to a user 102. The mobile device 100 may include a speaker and/or an audio outlet to provide audio feedback to the user 102. In the example of FIG. 1, the mobile device 100 may be configured to present a mobile application 110 on a display of the mobile device 100. The user interface illustrated in FIG. 1 may include an ad slot 120 at which an advertisement or ad impression may be presented or served to the user 102. The ad slot 120 may be a banner ad slot or an interstitial ad slot.

To determine an ad to present at the ad slot 120, the mobile device 100 may communicate ad slot information to one or more ad exchange server(s) 130 via one or more network(s) 104. The ad slot information may include a mobile device identifier, a publisher identifier, a mobile application identifier, user information, a user identifier, ad slot dimensions, ad slot positioning information (e.g., interstitial, banner, etc.), or other information. The one or more network(s) 104 may be any suitable wired or wireless network. The ad exchange server(s) 130 may be configured to facilitate presentation of an ad impression at the ad slot 120. The ad exchange server(s) 130 may receive the ad slot information at block 152. The ad slot information may be aggregated and/or determined and sent by software resident on the mobile device 100. In some embodiments, the ad slot information may be sent by software embedded on an operating system of the mobile device 100 that communicates with mobile applications executing on the mobile device 100, or by software included as part of a mobile application. At block 154, the ad exchange server(s) 130 may identify a publisher associated with the mobile application 110, as well as predetermined price points associated with the publisher. For example, the ad exchange server(s) 130 may identify the publisher based at least in part on the ad slot information. The ad exchange server(s) 130 may determine, based at least in part on the publisher, a set of predetermined price points associated with the publisher. The predetermined price points may be previously negotiated or contracted prices at which the publisher may sell certain ad inventory. For example, a publisher may agree to sell a banner ad slot at a price point of $5 and an interstitial ad slot during off-peak hours at a price point of $1. The predetermined price points may be associated with the publisher and may be stored locally or remotely and may otherwise be accessible by the ad exchange server(s) 130.

The ad exchange server(s) 130 may generate a bid request at block 156. The bid request may be a request for bids for the available ad slot 120. The bid request may include some or all of the ad slot information. In some embodiments, the bid request may include multiple ad sizes per available ad slot. The ad exchange server(s) 130 may send the bid request to one or more ad server(s) 140 in communication with the ad exchange server(s) 130. The ad server(s) 140 may receive the bid request at block 158. The ad server(s) 140 may evaluate the bid request and determine whether to submit a bid in response to the bid request and/or a bid amount to submit to the ad exchange server(s) 130. In the illustrated example, the ad server(s) 140 may submit respective bids to the ad exchange server(s) 130 at block 160.

The ad exchange server(s) 130 may receive the bids from the ad server(s) 140, and may evaluate the bids. At block 162, the ad exchange server(s) 130 may determine a highest bid amount associated with the received bids, as well as all price points that are equal to or less than the highest bid amount. For example, if the highest bid is $4, at the available price points are $1, $2, $3, $4, and $5, the ad exchange server(s) 130 may determine that the highest bid is $4, and may determine that price points $1, $2, $3, and $4 are equal to or less than the highest bid amount.

At block 164, the ad exchange server(s) 130 may send ad information including the highest bid amount and the determined price points to the mobile device 100. The ad exchange server(s) 130 may determine an advertisement associated with the highest bid, and may send an ad identifier associated with the advertisement to the mobile device 100. The ad identifier may be included in the ad information. The ad exchange server(s) 130 may cache the advertisement and/or the ad creative associated with the highest bid.

At block 166, the mobile device 100 may receive the ad information and may send some or all of the ad information, along with ad targeting criteria, to one or more publisher ad server(s) 150. The publisher ad server(s) 150 may be one or more third party servers or may be an in-house publisher ad server, or a combination thereof. An in-house publisher ad server may be under control of the publisher. The ad targeting criteria may include target user information, such as target demographic, target age or age range, target gender, target mobile device type, target geographic location, or other target audience information. The publisher ad server(s) 150 may be a third party ad server or third party ad exchange server in some embodiments. The publisher ad server(s) 150 may be configured to determine a winning bid and/or a winning advertisement to present at the ad slot 120.

At block 168, the publisher ad server(s) 150 may receive the ad information and the ad targeting criteria. At block 170, the publisher ad server(s) 150 may determine a winning advertisement for presentation at the ad slot 120. The winning advertisement may be determined based at least in part on a bid amount and/or a match or relative match between user attributes of the user 102 and/or device attributes of the mobile device 100 and the ad targeting criteria. In some embodiments, the winning advertisement may be determined based at least in part on both the bid amount and level of match between the ad targeting criteria and the user or device attributes. In other embodiments, the winning advertisement may be determined based solely on bid amount.

At block 172, the mobile device 100 may receive winning ad information. The mobile device 100 may request ad creative associated with the winning ad at block 174. The mobile device 100 may request ad creative, in one example, via a HyperText Markup Language (HTML) to the ad exchange server(s) 130. The ad exchange server(s) 130 may send the ad creative to the mobile device 100 at block 176. In some embodiments, the ad creative may be the ad impression information that was cached by the ad exchange server(s) 130, reducing latency associated with sending the ad creative.

At block 178, the mobile device 100 may receive the ad creative and may present the ad at the ad slot 120. As a result, the mobile device 100 may present the winning ad 180 at the ad slot 120 for consumption by the user 100. In some embodiments, a proxy may be utilized for delivery of ad creative, which may facilitate presentation of the ad regardless of ad blocking software. In embodiments where a proxy is used, ads may be delivered from the publisher's domain, as opposed to an ad server's domain, and may be presented without being blocked by ad blocking software. While discussed in the context of a visual advertisement, embodiments of the disclosure may relate to audio advertisements.

Accordingly, the ad slot 120 may have gone unsold or may have sold for a relatively low price had the publisher ad server(s) 150 been the only outlet for the sale of the ad slot. By including the ad exchange server(s) 130 in the example of FIG. 1, the ad slot 120 may have sold and may have sold for a relatively higher price, resulting in increased user reach for the advertiser that won the ad slot, as well as increased revenue and fill rate for the publisher or developer of the mobile application 110. Further, bandwidth and computing power requirements at the ad exchange server(s) 130 may be reduced as the ad creative does not have to be sent to the mobile device 100 upon determining a highest bid; rather, the ad exchange server(s) 130 may cache the ad creative until requested by the mobile device 100. Therefore, in instances where the publisher ad server(s) 150 determine another ad is a winning ad, the cached ad is not sent to the mobile device 100 and the bandwidth usage and computing power requirements are both reduced.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Processes and Use Cases

Figure 2:
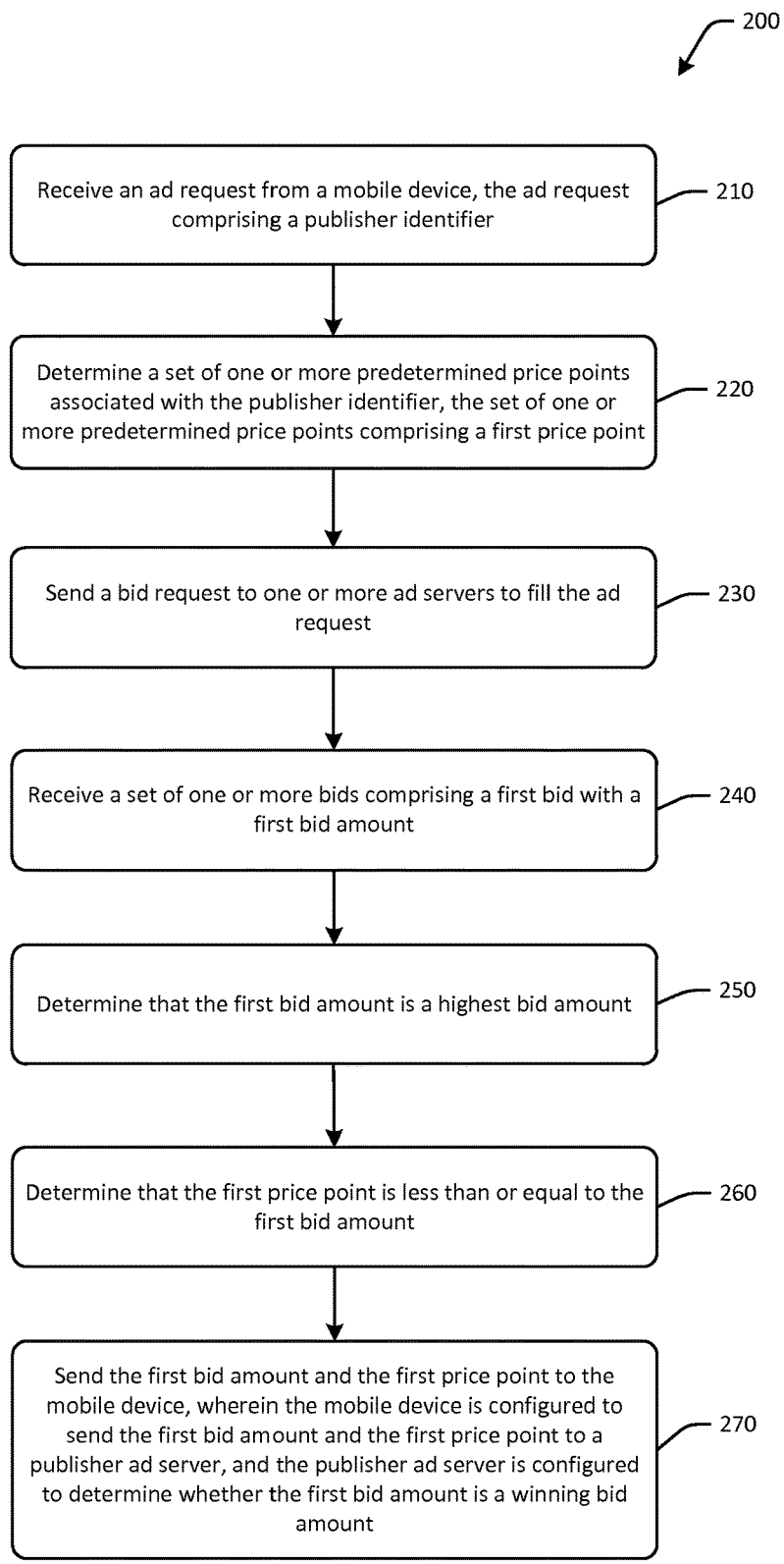
FIG. 2 is a schematic illustration of an example process flow for optimizing ad request fulfillment for mobile device applications in accordance with one or more example embodiments of the disclosure.

FIG. 2 depicts an example process flow 200 for optimization of ad request fulfillment for mobile device applications in accordance with one or more embodiments of the disclosure. While example embodiments of the disclosure may be described in the context of digital ads presented on mobile devices, it should be appreciated that the disclosure is more broadly applicable to other ads, such as audible ads. Although certain operations are illustrated as occurring separately in FIG. 2 for clarity, some or all of the operations may occur concurrently or partially concurrently.

At block 210 of the process flow 200 in FIG. 2, an ad exchange server may receive an ad from a mobile device, the ad request comprising a publisher identifier. The ad exchanger server may use the publisher identifier to determine or identify predetermined price points associated with the publisher identifier. The ad request may include first ad slot information indicative of an available ad slot at which an ad impression is to be presented. The ad slot information may include ad slot positioning information, a mobile device identifier, a mobile application publisher identifier, user information, a user identifier, and the like.

At block 220, computer-executable instructions of one or more modules stored on one or more memory devices of the ad exchange server may be executed to determine a set of one or more predetermined price points associated with the publisher identifier, the set of one or more predetermined price points comprising a first price point. In some embodiments, the ad exchange server may determine or identify a second price point that is greater than the first price point. The set of predetermined price points may be indicative of price points for ad slots associated with the mobile application publisher identifier. If the ad exchange server determines that there are no price points available or associated with the publisher identifier, the ad exchange server may notify the mobile device accordingly.

At block 230, computer-executable instructions of the ad exchange server may be executed to send a bid request to one or more ad servers to fill the ad request. The bid request may include some or all of the ad slot information.

At block 240, the ad exchange server may receive a set of one or more bids. The set of one or more bids may include a first bid with a first bid amount and a second bid with a second amount. One or more of the bids may be associated with ad impression identifiers or ad identifiers. The ad impression identifiers or ad identifiers may be associated with respective digital advertisements. The mobile application may include a unique source identifier and/or application identifier that identifies the mobile application and can be used by advertisers to target certain devices and/or mobile applications.

At block 250, computer-executable instructions of the ad exchange server may be executed to determine that the first bid amount is a highest bid amount. In some embodiments, the ad exchange server may conduct or facilitate a second price auction to determine a final bid amount based at least in part on the set of one or more bids and the highest bid amount. The ad exchange server may determine an ad identifier associated with the first bid At block 260, computer-executable instructions of the ad exchange server may be executed to determine that the first price point is less than or equal to the first bid amount. Alternately, the ad exchange server may determine that the first bid amount is greater than the first price point. In certain embodiments, the ad exchange server may determine that the first bid amount is less than a second price point. The ad exchange server may optionally compare the highest bid amount to one or more of the predetermined price points to determine a set of qualifying price points. Qualifying price points may be price points that are equal to or less than the highest bid amount. For example, if the highest bid is $4.50 and the predetermined price points are $1, $2, $3, $4, $5, then the ad exchange server may determine that $4, $3, $2, and $1 are qualifying price points. In this example, rather than returning a single price point or only a highest price point, more than one price point may be a qualifying price point so as to maximize revenue for developers in instances where the highest bidding ad is missing or has a non-optimal set up from the publisher. In some embodiments, the set of one or more predetermined price points may include a second price point and a third price point, and the ad exchange server may determine that the second price point is greater than the highest bid amount. The second price point may therefore not be included in the set of qualifying price pints. If the ad exchange server determines that the third price point is less than the highest bid amount, the third price point may be included in the set of qualifying price points. If, during the bidding process, no bids are received, or no bid amounts are received that meet a minimum price point, resulting in no qualifying price points, the ad exchange server may discard the ad request and/or may send a notification to the mobile device indicating that no bids or no sufficient bid amounts were received.

In some embodiments, such as instances where the ad request includes ad slot positioning information, the ad exchange server may determine ad slot dimensions associated with the ad request, and may determine that ad dimensions of an ad associated with the first bid correspond to the ad slot dimensions. Because the ad dimensions of the ad correspond to the ad slot dimensions, the ad exchange server may determine that the ad satisfies the ad slot positioning information. If the ad dimensions did not correspond to the ad slot dimensions, the ad exchange server may determine a second highest bidding amount to determine whether an ad associated with the second highest bidding amount satisfies the ad slot dimensions. For example, an ad slot may be dimensioned at 300×50 or 1024×50, whereas the ad may be dimensioned at 320×480 or 1024×768. The ad exchange server may continue this iterative process until an appropriate ad is identified.

Upon determining a highest bid amount, the ad exchange server may cache ad information associated with the ad submitted with the highest bid amount. The ad information may include ad creative or other data to facilitate presentation of the ad, such as an impression pixel.

At block 270, computer-executable instructions of the ad exchange server may be executed to send sending the first bid amount and the first price point to the mobile device, where the mobile device is configured to send the first bid amount and the first price point to a publisher ad server, and the publisher ad server is configured to determine whether the first bid amount is a winning bid amount. In some embodiments, only the determined price points and a bid identifier, and not the bid amounts, may be sent to the publisher ad server. The ad exchange server may send price point information, which may include the first price point and the first bid amount to the mobile device. In some embodiments, the ad exchange server may send the ad identifier to the mobile device, and the mobile device may send the ad identifier to the publisher ad server. The mobile device may include a mobile application with a first software module configured to communicate with the ad exchange server and a second software module configured to communicate with the first software module and the publisher ad server, in an example embodiment. In some embodiments, a separate system may be configured to automatically create and/or manage one or more publisher ad campaigns. For example, a publisher may provide explicit or implicit authority and/or login credentials (e.g., an API key, etc.) to a system of the disclosure, which may be used to create and manage new ad campaigns for the publisher without active publisher involvement. In another example, a publisher ad server may be configured to make an API to API connection directly with the ad exchange server to enable direct transfer of ad information.

The publisher ad server may be an ad server or an ad exchange server and may be configured to evaluate bids and/or ad targeting criteria. For example, the mobile device may be configured to send ad targeting criteria to the publisher ad server. The ad targeting criteria may include information related to a target audience for the ad and/or the mobile application on the mobile device. In such instances, the publisher ad server may be configured to determine that the ad at least partially satisfies the ad targeting information. The publisher ad server may be configured to perform an independent auction for the available ad slot, and/or to compare the first bid amount to bids received by the publisher ad server to determine whether the first bid amount is a winning bid amount. In some embodiments, the publisher ad server may further determine whether a bid amount is a highest bid amount, but an ad associated with the bid amount does not satisfy targeting criteria, in which case the highest bid amount may not be a winning bid amount.

The publisher ad server may notify the mobile device of a winning ad or a winning bid, for example via an ad identifier. The mobile device may receive the winning ad information from the publisher ad server and may request the winning ad material, such as ad creative, from the appropriate entity. In an instance where the publisher ad server determines that the ad associated with the first bid is a winning ad, the mobile device may request the appropriate ad creative from the ad exchange server.

The ad exchange server may receive, from the mobile device, a creative request for the ad or ad creative associated with the first bid. The request may include the ad impression identifier from the mobile device. The ad exchange server may send first ad impression information, which may include the ad creative, which may be cached, to the mobile device for presentation of the digital advertisement at the available ad slot. The ad creative may be served from the cache in JSONP format. In some embodiments, the ad creative may be presented such that click action opens a separate browser to load the destination page at the mobile device.

In some embodiments, the first ad impression information may include an impression pixel. In such instances, the ad exchange server may receive a confirmation notification indicating that the impression pixel was presented, and the ad exchange server may increment an impression count associated with the ad impression identifier. If the first ad impression information includes an impression pixel and the ad exchange does not receive the confirmation notification, after a predetermined length of time, the ad exchange server may determine that the first ad impression was not served.

Figure 3:
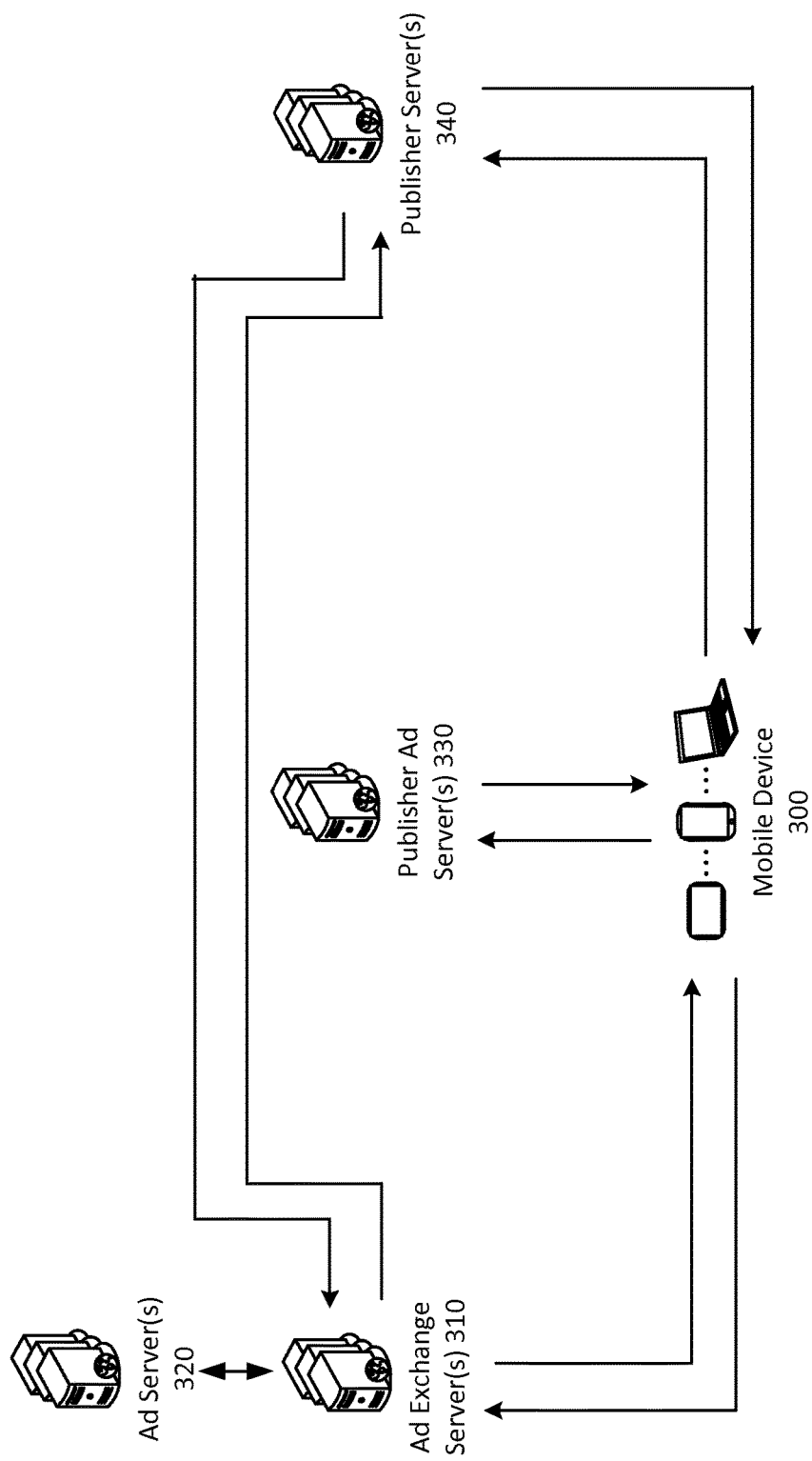
FIG. 3 schematically illustrates communication between components of an example environment in communication in accordance with one or more example embodiments of the disclosure.

FIG. 3 schematically illustrates communication between components of an example environment in communication in accordance with one or more example embodiments of the disclosure. For example, in FIG. 3, a mobile device 300 may be in communication with one or more ad exchange server(s) 310. The ad exchange server(s) 310 may be in communication with one or more ad server(s) 320. The mobile device 300 may be in communication with one or more publisher ad server(s) 330 and one or more publisher server(s) 340. The ad exchange server(s) 310 may be in communication with the one or more publisher server(s) 340.

Figure 4:
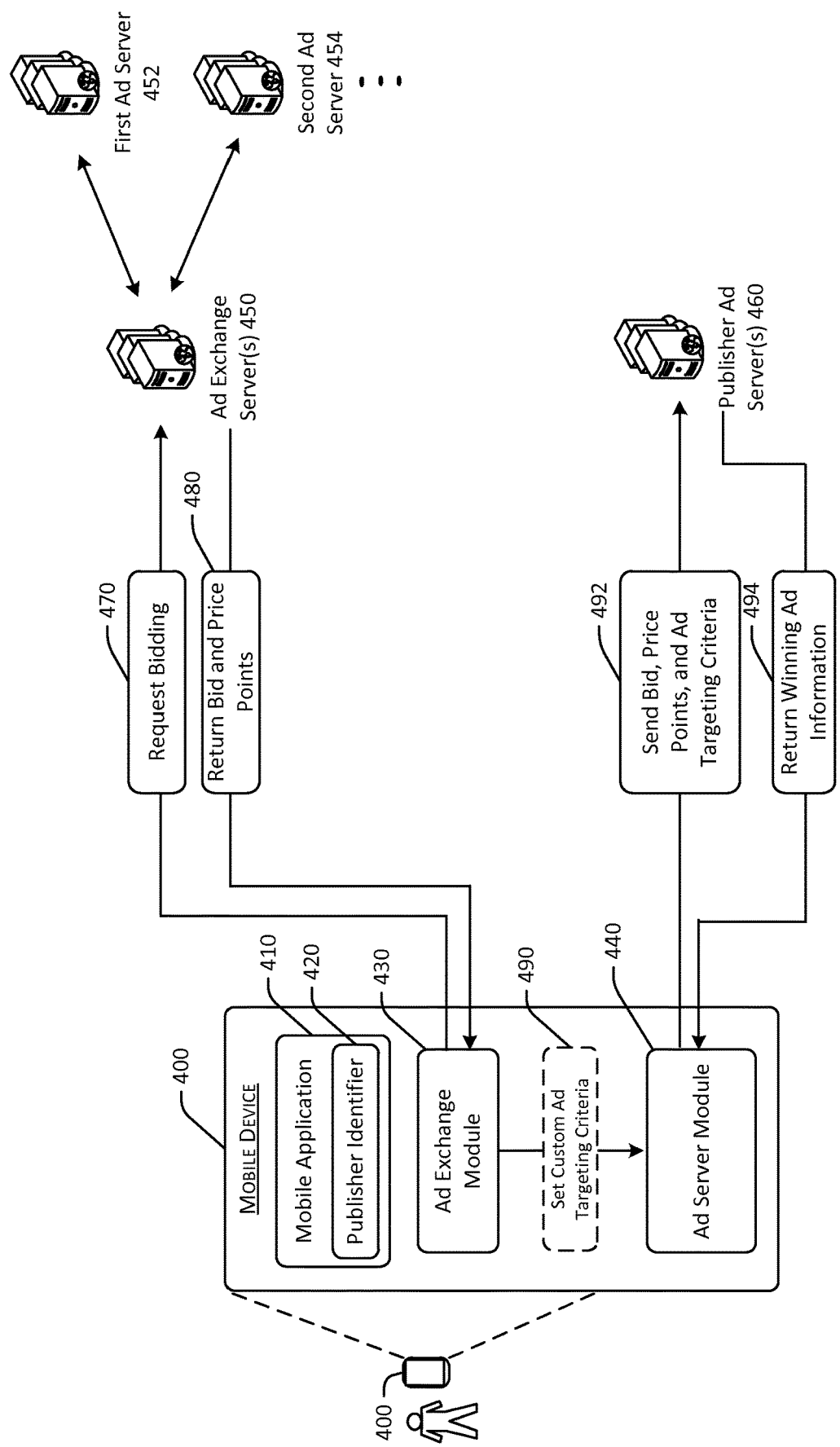
FIG. 4 is a schematic illustration of an example hybrid process and data flow diagram with a mobile device in accordance with one or more example embodiments of the disclosure.

FIG. 4 is a schematic illustration of an example hybrid process and data flow diagram with a mobile device in accordance with one or more example embodiments of the disclosure. FIG. 4 includes a mobile device 400 with a mobile application 410 executing thereon. The mobile application 410 may include a publisher identifier 420. The mobile device 400 may include an ad exchange module 430 and an ad server module 440. The ad exchange module 430 may be configured to facilitate communication between the mobile device 400 and one or more ad exchange server(s) 450. The ad server module 440 may be configured to facilitate communication between the mobile device 400 and one or more publisher ad server(s) 460.

At block 470, computer-executable instructions of the ad exchange module 430 may be executed to cause the mobile device 400 to request bidding or send an ad request for an available ad slot at the mobile application 410 to the ad exchange server(s) 450. The ad exchange server(s) 450 may facilitate an auction or bidding process via communication with a first ad server 452, a second ad server 454, and so forth.

At block 480, the ad exchange server(s) 450 may return a highest bid and qualifying price points to the ad exchange module 490 of the mobile device 400.

At block 490, the ad exchange module 430 may set custom ad targeting criteria and may send the received bid and qualifying price points, along with the ad targeting criteria, to the ad server module 440. The ad server module 440 may receive the bid, the price point information, and the ad targeting criteria. In some embodiments, the custom ad targeting criteria may be set prior to requesting bidding at block 470.

At block 492, the ad server module 440 may send the bid, the qualifying price points, and the ad targeting criteria to the publisher ad server(s) 460. The publisher ad server(s) 460 may evaluate the bid and the price points, and in some instances perform an independent auction process, to determine a winning bid and/or a winning advertisement.

At block 494, the publisher ad server(s) 460 may send or return winning ad information, such as a winning ad identifier, to the ad server module 440.

Figure 5:
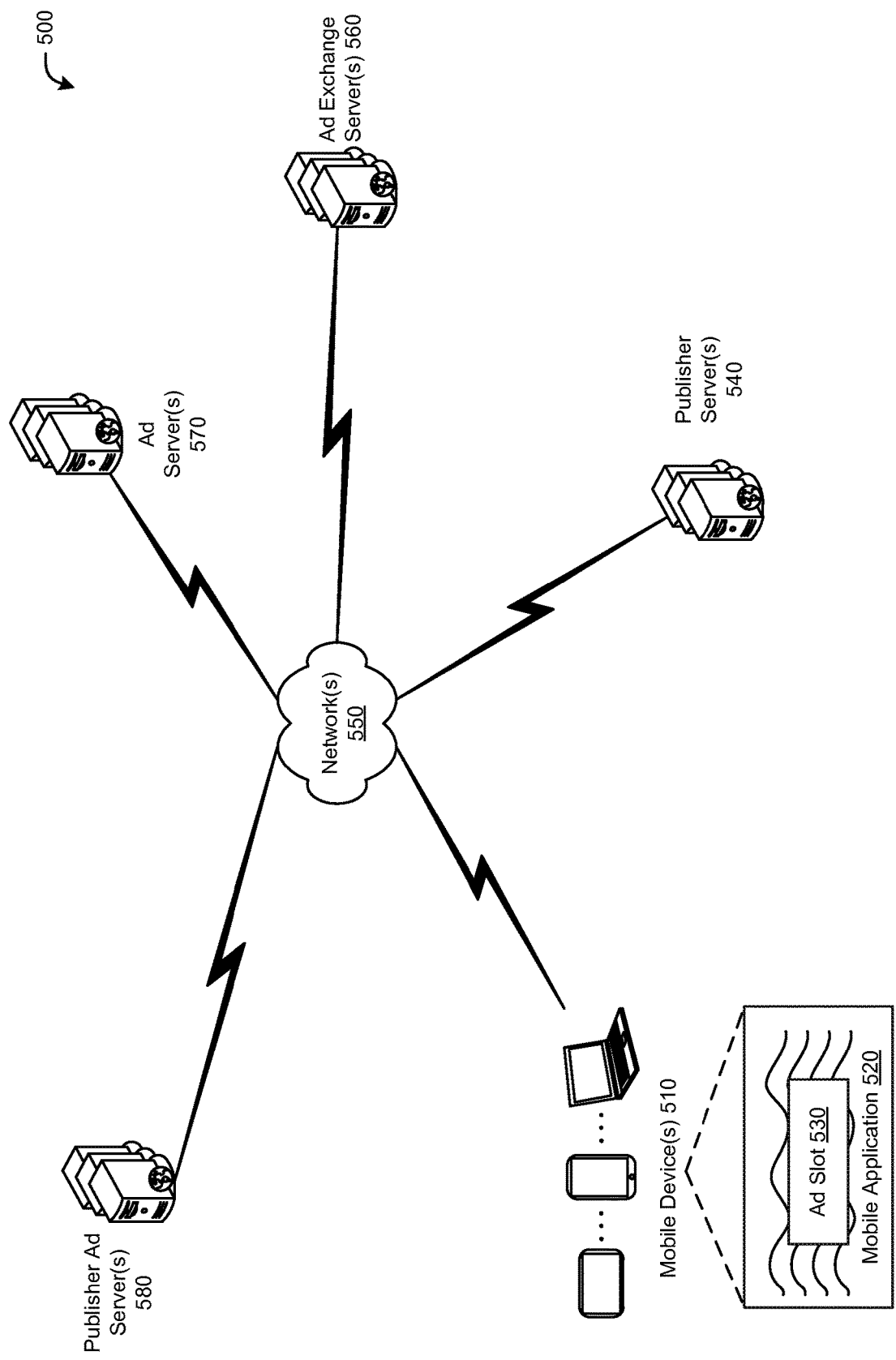
FIG. 5 schematically illustrates an example computer environment in accordance with one or more embodiments of the disclosure.

Referring now to FIG. 5, a schematic illustration of an example computer environment 500 in accordance with one or more embodiments of the disclosure is depicted. A mobile device 510 may include a mobile application 520 with an available ad slot 530. The mobile device 510 may communicate with one or more components via one or more networks to fill the available ad slot 530. For example, the mobile device 510 may communicate with one or more publisher server(s) 540 to render the mobile application 520. The mobile device 510 and/or the publisher server(s) 540 may communicate with one or more ad exchange server(s) 560 to identify the ad slot 530 and to fill the ad slot 530 with an advertisement. The mobile device 510 and/or the publisher server(s) 540 may also communicate with one or more publisher ad server(s) 580 at the same time or at substantially the same time as the communication with the ad exchange server(s) 560 to fill the ad slot 530. The ad exchange server(s) 560 may communicate with one or more ad server(s) 570 to determine an ad with which to fill the ad slot 530. Similarly, the publisher ad server(s) 580 may communicate with one or more ad servers to solicit bids for the ad slot 530. The publisher ad server(s) 580 may be configured to evaluate bids and targeting criteria to select or determine a winning bid that may be communicated to the mobile device 530 and served at the ad slot 530. Other embodiments may include additional or fewer, or different, components than those illustrated in FIG. 5.

One or more operations of the method, process flows, or use cases of FIGS. 1-5 may have been described above as being performed by a mobile device, or more specifically, by one or more program modules, applications, or the like executing on a device. It should be appreciated, however, that any of the operations of methods, process flows, or use cases of FIGS. 1-5 may be performed, at least in part, in a distributed manner by one or more other devices, or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-5 may be described in the context of the illustrative devices, it should be appreciated that such operations may be implemented in connection with numerous other device configurations.

The operations described and depicted in the illustrative methods, process flows, and use cases of FIGS. 1-5 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 6:
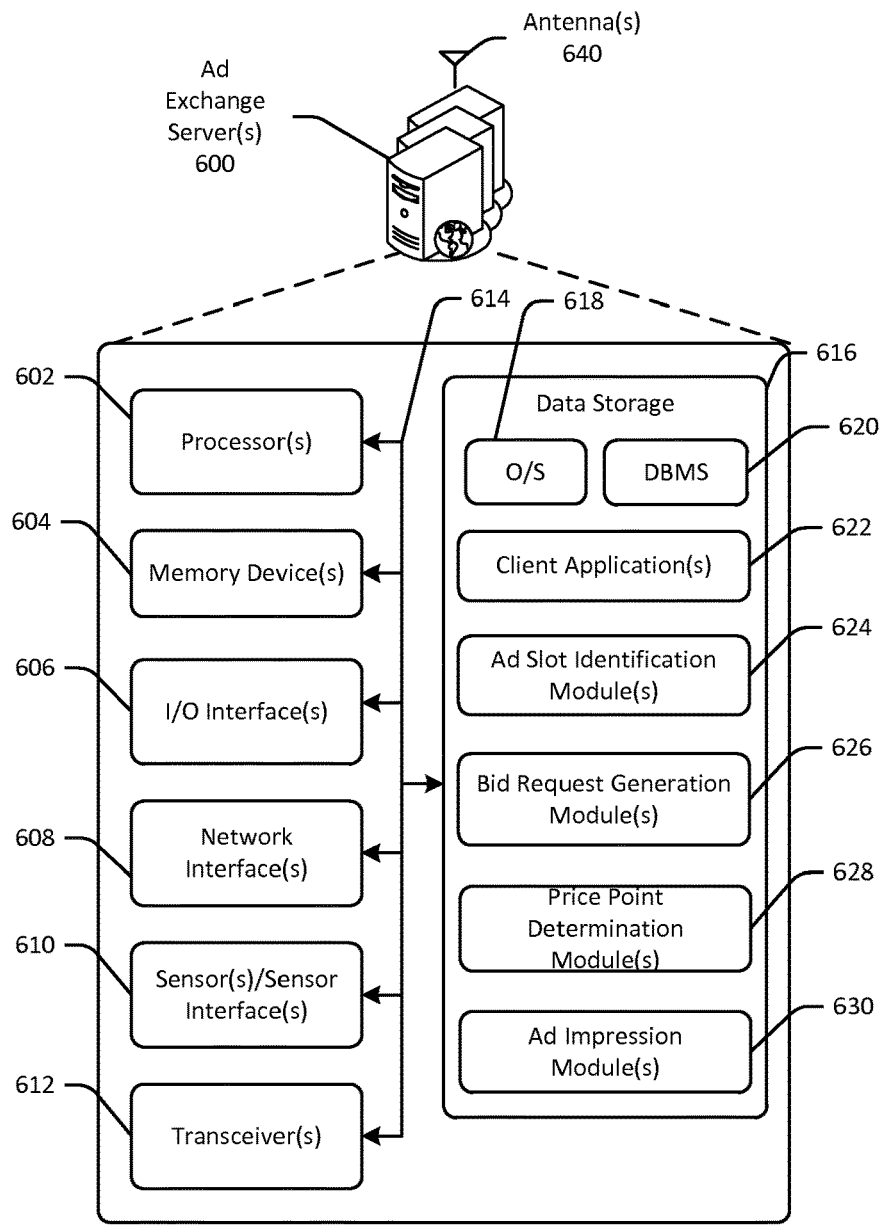
FIG. 6 is a schematic diagram of an illustrative device architecture in accordance with one or more example embodiments of the disclosure.

FIG. 6 is a schematic diagram of an illustrative device architecture of an ad exchange server(s) 600 in accordance with one or more example embodiments of the disclosure. The ad exchange server(s) 600 may include any suitable computing device including, but not limited to, a remote server, a mobile device such as a smartphone, tablet, e-reader, wearable device, or the like; a desktop computing device; a laptop computing device; and so forth. The ad exchange server(s) 600 may correspond to an illustrative device configuration for the ad exchange servers of FIGS. 1-5.

The ad exchange server(s) 600 may be connected to other devices via one or more network(s). Example network(s) may include, but are not limited to, any one or more different types of suitable communications networks, such as cable networks, the Internet, wireless networks, cellular networks, or other private and/or public networks. Further, the network(s) may include any type of medium over which network traffic may be carried including, but not limited to, coaxial cable, twisted-pair wire, optical fiber, hybrid fiber coaxial (HFC), microwave terrestrial transceivers, a radio frequency communication medium, a satellite communication medium, or any combination thereof.

In an illustrative configuration, the ad exchange server(s) 600 may include one or more processors (processor(s)) 602, one or more memory device(s) 604 (generically referred to herein as memory 604), one or more input/output ("I/O") interface(s) 606, one or more network interface(s) 608, one or more sensors or sensor interface(s) 610, one or more transceiver(s) 612, and data storage 616. The ad exchange server(s) 600 may further include one or more buses 614 that functionally couple various components of the ad exchange server(s) 600. The ad exchange server(s) 600 may further include one or more antennas 640 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 614 may include at least one of a system bus, a memory bus, an address bus, or a message bus, and may permit exchange of information (e.g., data (including computer-executable code), signaling, etc.) between various components of the ad exchange server(s) 600. The bus(es) 614 may include, without limitation, a memory bus or a memory controller, a peripheral bus, an accelerated graphics port, and so forth. The bus(es) 614 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 604 of the ad exchange server(s) 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EE- PROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 616 may include removable storage and/or non-removable storage including, but not limited to, magnetic storage, optical disk storage, and/or tape storage. Persistent data storage, as that term is used herein, may include any of the types of data storage 616 mentioned above. The data storage 616 may provide non-volatile storage of computer-executable instructions and other data. The memory 604 and the data storage 616, removable and/or non-removable, are examples of computer-readable storage media (CRSM) as that term is used herein.

The data storage 616 may store computer-executable code, instructions, or the like that may be loadable into the memory 604 and executable by the processor(s) 602 to cause the processor(s) 602 to perform or initiate various operations. The data storage 616 may additionally store data that may be copied to memory 604 for use by the processor(s) 602 during the execution of the computer-executable instructions. Moreover, output data generated as a result of execution of the computer-executable instructions by the processor(s) 602 may be stored initially in memory 604, and may ultimately be copied to data storage 616 for non-volatile storage.

More specifically, the data storage 616 may store one or more operating systems (O/S) 618; one or more database management systems (DBMS) 620; and one or more program modules, applications, engines, or the like such as, for example, one or more client application(s) 622, one or more ad slot identification module(s) 624, one or more bid request generation module(s) 626, one or more price point determination module(s) 628, one or more ad impression module(s) 630, and so forth. These program modules, applications, engines, or the like may be configured to perform operations described earlier in this application in connection with corresponding components. Any of the program modules, applications, engines, or the like depicted in FIG. 6 may include any combination of software, firmware, and/or hardware. The software and/or firmware may include computer-executable code, instructions, or the like that may be loaded into the memory 604 for execution by one or more of the processor(s) 602. The data storage 616 may further store various types of data. Any data stored in the data storage 616 may be loaded into the memory 604 for use by the processor (s) 602 in executing computer-executable code. In addition, any data depicted as being stored in the data storage 616 may potentially be stored in one or more datastore(s) (not shown in FIG. 6) and may be accessed via the DBMS 620 and loaded in the memory 604 for use by the processor(s) 602 in executing computer-executable code. Such datastore(s) may include, but are not limited to, databases (e.g., relational, object-oriented, etc.), file systems, flat files, distributed datastore(s) in which data is stored on more than one node of a computer network, peer-to-peer network datastore(s), or the like.

The processor(s) 602 may be configured to access the memory 604 and execute computer-executable instructions loaded therein. For example, the processor(s) 602 may be configured to execute computer-executable instructions of the various program modules, applications, engines, or the like of the ad exchange server(s) 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to functionality supported by the various program modules depicted in FIG. 6, the ad slot identification module(s) 624 may include computer-executable instructions, code, or the like that responsive to execution by one or more of the processor(s) 602 may perform functions including, but not limited to, parsing ad requests to identify or determine available ad slots or to otherwise determine ad slots that may become available for which an ad is needed or at which an ad may be presented. The ad slot identification module(s) 624 may be configured to determine ad slot positioning information, ad slot dimension information, and the like.

The bid request generation module(s) 626 may include computer-executable instructions, code, or the like that responsive to execution by one or more of the processor(s) 602 may perform functions including, but not limited to, generate bid requests based at least in part on ad requests, communicate with one or more ad servers to facilitate the bidding process, and the like. In some embodiments, the bid request generation module(s) 626 may be configured to generate a rank or otherwise determine a rank of candidate advertisements based at least in part on user information, such as user attributes. The bid request generation module(s) 626 may receive quality metrics associated with an available ad slot and may analyze the received ad slot information based at least in part on the quality metrics. In this manner, the bid request generation module(s) 626 may determine a "quality" or value of the ad slot The price point determination module(s) 628 may include computer-executable instructions, code, or the like that responsive to execution by one or more of the processor(s) 602 may perform functions including, but not limited to, determine a highest bid amount, determine qualifying price points, and communicate information to a mobile device.

The ad impression module(s) 630 may include computer-executable instructions, code, or the like that responsive to execution by one or more of the processor(s) 602 may perform functions including, but not limited to, determining ad impression information associated with bids, caching ad impression information, and communicating ad impression information to a mobile device.

Referring now to other illustrative components depicted as being stored in the data storage 616, the O/S 618 may be loaded from the data storage 616 into the memory 604 and may provide an interface between other application software executing on the ad exchange server(s) 600 and hardware resources of the ad exchange server(s) 600. More specifically, the O/S 618 may include a set of computer-executable instructions for managing hardware resources of the ad exchange server(s) 600 and for providing common services to other application programs (e.g., managing memory allocation among various application programs). In certain example embodiments, the O/S 618 may control execution of one or more of the program modules depicted as being stored in the data storage 616. The O/S 618 may include any operating system now known or which may be developed in the future including, but not limited to, any server operating system, any mainframe operating system, or any other proprietary or non-proprietary operating system.

The DBMS 620 may be loaded into the memory 604 and may support functionality for accessing, retrieving, storing, and/or manipulating data stored in the memory 604 and/or data stored in the data storage 616. The DBMS 620 may use any of a variety of database models (e.g., relational model, object model, etc.) and may support any of a variety of query languages. The DBMS 620 may access data represented in one or more data schemas and stored in any suitable data repository. In those example embodiments in which the ad exchange server(s) 600 is a mobile device, the DBMS 620 may be any suitable light-weight DBMS optimized for performance on a mobile device.

Referring now to other illustrative components of the ad exchange server(s) 600, the input/output (I/O) interface(s) 606 may facilitate the receipt of input information by the ad exchange server(s) 600 from one or more I/O devices as well as the output of information from the ad exchange server(s) 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the ad exchange server(s) 600 or may be separate. The I/O devices may further include, for example, any number of peripheral devices such as data storage devices, printing devices, and so forth.

The I/O interface(s) 606 may also include an interface for an external peripheral device connection such as universal serial bus (USB), FireWire, Thunderbolt, Ethernet port or other connection protocol that may connect to one or more networks. The I/O interface(s) 606 may also include a connection to one or more of the antenna(s) 640 to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The ad exchange server(s) 600 may further include one or more network interface(s) 608 via which the ad exchange server(s) 600 may communicate with any of a variety of other systems, platforms, networks, devices, and so forth. The network interface(s) 608 may enable communication, for example, with the back-end server(s) 202 via the network (s) 206.

The antenna(s) 640 may include any suitable type of antenna depending, for example, on the communications protocols used to transmit or receive signals via the antenna (s) 640. Non-limiting examples of suitable antennas may include directional antennas, non-directional antennas, dipole antennas, folded dipole antennas, patch antennas, multiple-input multiple-output (MIMO) antennas, or the like. The antenna(s) 640 may be communicatively coupled to one or more transceiver(s) 612 or radio components to which or from which signals may be transmitted or received.

As previously described, the antenna(s) 640 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 640 may additionally, or alternatively, include a Wi-Fi antenna configured to transmit or receive signals in accordance with established standards and protocols, such as the IEEE 802.11 family of standards, including via 2.4 GHz channels (e.g. 802.11b, 802.11g, 802.11n), 5 GHz channels (e.g. 802.11n, 802.11ac), or 60 GHZ channels (e.g. 802.11ad). In alternative example embodiments, the antenna(s) 640 may be configured to transmit or receive radio frequency signals within any suitable frequency range forming part of the unlicensed portion of the radio spectrum.

The antenna(s) 640 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 612 may include any suitable radio component(s) for—in cooperation with the antenna(s) 640—transmitting or receiving radio frequency (RF) signals in the bandwidth and/or channels corresponding to the communications protocols utilized by the ad exchange server(s) 600 to communicate with other devices. The transceiver(s) 612 may include hardware, software, and/or firmware for modulating, transmitting, or receiving—potentially in cooperation with any of antenna(s) 640—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 612 may further include hardware, firmware, or software for receiving GNSS signals. The transceiver(s) 612 may include any known receiver and baseband suitable for communicating via the communications protocols utilized by the ad exchange server(s) 600. The transceiver(s) 612 may further include a low noise amplifier (LNA), additional signal amplifiers, an analog-to-digital (A/D) converter, one or more buffers, a digital baseband, or the like.

The sensor(s)/sensor interface(s) 610 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

It should be appreciated that the program modules, applications, computer-executable instructions, code, or the like depicted in FIG. 6 as being stored in the data storage 616 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the ad exchange server(s) 600, and/or hosted on other computing device(s) accessible via one or more networks, may be provided to support functionality provided by the program modules, applications, or computer-executable code depicted in FIG. 6 and/or additional or alternate functionality. Further, functionality may be modularized differently such that processing described as being supported collectively by the collection of program modules depicted in FIG. 6 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 6 may be implemented, at least partially, in hardware and/or firmware across any number of devices.

It should further be appreciated that the ad exchange server(s) 600 may include alternate and/or additional hardware, software, or firmware components beyond those described or depicted without departing from the scope of the disclosure. More particularly, it should be appreciated that software, firmware, or hardware components depicted as forming part of the ad exchange server(s) 600 are merely illustrative and that some components may not be present or additional components may be provided in various embodiments. While various illustrative program modules have been depicted and described as software modules stored in data storage 616, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

One or more operations of the methods described herein may be performed by a device having the illustrative configuration depicted in FIG. 6, or more specifically, by one or more engines, program modules, applications, or the like executable on such a device. It should be appreciated, however, that such operations may be implemented in connection with numerous other device configurations.

The operations described and depicted in the illustrative methods described herein may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:

receiving, by an ad exchange server comprising at least one processor, first ad slot information from a mobile device, the ad slot information indicative of an available ad slot at which an ad impression is to be presented, wherein the ad slot information comprises ad slot positioning information, a mobile device identifier, and a mobile application publisher identifier;

determining, by the ad exchange server, a set of predetermined price points associated with the mobile application publisher identifier comprising a first price point and a second price point that is greater than the first price point, the set of predetermined price points indicative of price points for ad slots associated with the mobile application publisher identifier;

sending, by the ad exchange server, a first bid request for the available ad slot to a first ad server in communication with the ad exchange server, the first bid request comprising the ad slot information;

receiving, by the ad exchange server, a set of bids for the available ad slot, the set of bids comprising a first bid and a second bid, the first bid comprising an ad impression identifier associated with a digital advertisement;

determining, by the ad exchange server, a first bid amount associated with the first bid is greater than a second bid amount associated with the second bid;

determining, by the ad exchange server, that the first bid amount is greater than the first price point and is less than the second price point;

caching, by the ad exchange server, first ad impression information associated with the ad impression identifier to generate cached first ad impression information, wherein the cached first ad impression information comprises an impression pixel;

sending, by the ad exchange server, first price point information to the mobile device, the first price point information comprising the first price point, the first bid amount, and the ad impression identifier;

receiving, by a second ad server associated with a third party, targeting criteria for the available ad slot and the first price point information from the mobile device;

determining, by the second ad server, that i) the digital advertisement associated with the first bid satisfies the targeting criteria, and ii) the first bid amount is a winning bid amount;

receiving, by the ad exchange server, a creative request comprising the ad impression identifier from the mobile device;

sending, by the ad exchange server, the cached first ad impression information to the mobile device for presentation of the digital advertisement at the available ad slot;

receiving, by the ad exchange server, a confirmation notification indicating that the impression pixel was presented at the available ad slot; and automatically incrementing, by the ad exchange server, an impression count associated with the ad impression identifier.

2. The method of claim 1, further comprising:

determining ad slot dimensions of the available ad slot;

determining that ad dimensions of the digital advertisement correspond to the ad slot dimensions;

determining that the digital advertisement satisfies the ad slot positioning information; and determining that the first ad server is associated with the digital advertisement.

3. The method of claim 1, wherein the available ad slot is a first available ad slot, the method further comprising:

receiving second ad slot information from the mobile device for a second available ad slot;

sending a second bid request for the second available ad slot;

receiving a third bid associated with a third amount that is greater than the second price point and less than a third price point;

receiving a fourth bid associated with a fourth amount that is less than the third amount;

conducting a second price auction to determine a final bid amount, wherein the final bid amount is less than the third amount and greater than the fourth amount; and sending second price point information to the mobile device, the second price point information comprising the first price point, the second price point, and the final bid amount.

4. A system comprising:

an ad exchange server;

a first ad server in communication with the ad exchange server;

a second ad server in communication with the ad exchange server; and a mobile device in communication with the ad exchange server;

wherein the ad exchange server is configured to:

receive first ad slot information from the mobile device, the ad slot information indicative of an available ad slot at which an ad impression is to be presented, wherein the ad slot information comprises ad slot positioning information, a mobile device identifier, and a mobile application publisher identifier;

determine a set of predetermined price points associated with the mobile application publisher identifier comprising a first price point and a second price point that is greater than the first price point, the set of predetermined price points indicative of price points for ad slots associated with the mobile application publisher identifier;

send a first bid request for the available ad slot to the first ad server, the first bid request comprising the ad slot information;

receive a set of bids for the available ad slot, the set of bids comprising a first bid and a second bid, the first bid comprising an ad impression identifier associated with a digital advertisement;

determine a first bid amount associated with the first bid is greater than a second bid amount associated with the second bid;

determine that the first bid amount is greater than the first price point and less than the second price point;

cache first ad impression information associated with the ad impression identifier to generate cached first ad impression information, wherein the cached first ad impression information comprises an impression pixel;

send first price point information to the mobile device, the first price point information comprising the first price point, the first bid amount, and the ad impression identifier;

receive a creative request comprising the ad impression identifier from the mobile device;

send the cached first ad impression information to the mobile device for presentation of the digital advertisement at the available ad slot;

receive a confirmation notification indicating that the impression pixel was presented at the available ad slot; and automatically increment an impression count associated with the ad impression identifier; and wherein the second ad server is configured to:

receive targeting criteria for the available ad slot and the first price point information from the mobile device; and determine that i) the digital advertisement associated with the first bid satisfies the targeting criteria, and ii) the first bid amount is a winning bid amount.

5. The system of claim 4, wherein the ad exchange server is further configured to:

receive, from the mobile device, a request for the ad, wherein the ad is associated with the first bid.

6. The system of claim 4, wherein the mobile device is configured to:

send ad targeting information to the second ad server; and wherein the second ad server is further configured to:

determine that the ad at least partially satisfies the ad targeting information.

7. The system of claim 4, wherein the ad exchange server is further configured to:

determine an ad associated with the first bid; and cache ad information associated with the ad.

8. The system of claim 4, wherein the ad exchange server is further configured to:

determine an ad associated with the first bid; and send an ad identifier for the ad to the mobile device, wherein the mobile device is configured to send the ad identifier to the second ad server.

9. The system of claim 4, wherein the set of one or more predetermined price points comprises a second price point and a third price point, and wherein the ad exchange server is further configured to:

determine that the second price point is greater than the highest bid amount;

determine that the third price point is less than the highest bid amount; and send the third price point to the mobile device.

10. The system of claim 4, wherein the ad request is a first ad request and the bid request is a first bid request, and wherein the ad exchange server is further configured to:
receive a second ad request from the mobile device, the second ad request comprising the publisher identifier;
send a second bid request to the one or more ad servers;
receive a single bid with a second bid amount;
determine that a second price point is a lowest price point;
determine that the second bid amount is less than the second price point; and
discard the second ad request.

11. The system of claim 4, wherein the mobile device comprises a mobile application with a first software module configured to communicate with the server comprising the at least one processor, and a second software module configured to communicate with the first software module and the second ad server.

12. The system of claim 4, wherein the ad exchange server is further configured to:
conduct a second price auction to determine a final bid amount based at least in part on the set of one or more bids.

13. The system of claim 4, wherein the ad request comprises ad slot positioning information, and wherein the ad exchange server is further configured to:
determine ad slot dimensions associated with the ad request;
determine that ad dimensions of an ad associated with the first bid correspond to the ad slot dimensions; and
determine that the ad satisfies the ad slot positioning information.

14. An apparatus comprising:
an ad exchange server;
a first ad server in communication with the ad exchange server;
a second ad server in communication with the ad exchange server; and
a mobile device in communication with the ad exchange server;
wherein the ad exchange server is configured to:
receive first ad slot information from the mobile device, the ad slot information indicative of an available ad slot at which an ad impression is to be presented, wherein the ad slot information comprises ad slot positioning information, a mobile device identifier, and a mobile application publisher identifier;
determine a set of predetermined price points associated with the mobile application publisher identifier comprising a first price point and a second price point that is greater than the first price point, the set of predetermined price points indicative of price points for ad slots associated with the mobile application publisher identifier;
send a first bid request for the available ad slot to the first ad server, the first bid request comprising the ad slot information;
receive a set of bids for the available ad slot, the set of bids comprising a first bid and a second bid, the first bid comprising an ad impression identifier associated with a digital advertisement;
determine a first bid amount associated with the first bid is greater than a second bid amount associated with the second bid;
determine that the first bid amount is greater than the first price point and less than the second price point;
cache first ad impression information associated with the ad impression identifier to generate cached first ad impression information, wherein the cached first ad impression information comprises an impression pixel;
send first price point information to the mobile device, the first price point information comprising the first price point, the first bid amount, and the ad impression identifier;
receive a creative request comprising the ad impression identifier from the mobile device;
send the cached first ad impression information to the mobile device for presentation of the digital advertisement at the available ad slot;
receive a confirmation notification indicating that the impression pixel was presented at the available ad slot; and
automatically increment an impression count associated with the ad impression identifier; and
wherein the second ad server is configured to:
receive targeting criteria for the available ad slot and the first price point information from the mobile device; and
determine that i) the digital advertisement associated with the first bid satisfies the targeting criteria, and ii) the first bid amount is a winning bid amount.

15. The apparatus of claim 14, wherein the ad exchange server is further configured to:
receive, from the mobile device, a request for the ad, wherein the ad is associated with the first bid.

16. The apparatus of claim 14, wherein the mobile device is configured to:
send ad targeting information to the second ad server; and
wherein the second ad server is further configured to:
determine that the ad at least partially satisfies the ad targeting information.

17. The apparatus of claim 14, wherein the ad exchange server is further configured to:
determine an ad associated with the first bid; and
cache ad information associated with the ad.

18. The apparatus of claim 14, wherein the ad exchange server is further configured to:
determine an ad associated with the first bid; and
send an ad identifier for the ad to the mobile device, wherein the mobile device is configured to send the ad identifier to the second ad server.

19. The apparatus of claim 14, wherein the set of one or more predetermined price points comprises a second price point and a third price point, and wherein the ad exchange server is further configured to:
determine that the second price point is greater than the highest bid amount;
determine that the third price point is less than the highest bid amount; and
send the third price point to the mobile device.

20. The apparatus of claim 14, wherein the ad request is a first ad request and the bid request is a first bid request, and wherein the ad exchange server is further configured to:
receive a second ad request from the mobile device, the second ad request comprising the publisher identifier;
send a second bid request to the one or more ad servers;
receive a single bid with a second bid amount;
determine that a second price point is a lowest price point;
determine that the second bid amount is less than the second price point; and
discard the second ad request.

* * * * *